United States Patent
North et al.

(10) Patent No.: US 6,297,176 B1
(45) Date of Patent: Oct. 2, 2001

(54) NON-FIBERGLASS SOUND ABSORBING MOLDABLE THERMOPLASTIC STRUCTURE

(75) Inventors: John M. North, Valatie, NY (US); Michael P. Albert, Newton, MA (US)

(73) Assignee: Harodite Industries, Inc., MA (US)

( * ) Notice: Subject to any disclaimer, the term of this patent is extended or adjusted under 35 U.S.C. 154(b) by 0 days.

(21) Appl. No.: 09/116,042

(22) Filed: Jul. 15, 1998

(51) Int. Cl.$^7$ ..................................................... B32B 27/02
(52) U.S. Cl. ........................... 442/120; 442/381; 442/392
(58) Field of Search ..................... 442/120, 381, 442/392

(56) References Cited

U.S. PATENT DOCUMENTS

| | | |
|---|---|---|
| 3,953,067 | 4/1976 | Isola . |
| 4,352,522 | 10/1982 | Miller . |
| 4,828,910 | 5/1989 | Haussling . |
| 4,840,832 | 6/1989 | Weinle et al. . |
| 5,011,218 | 4/1991 | Danner et al. . |
| 5,068,001 | 11/1991 | Haussling . |
| 5,258,585 | 11/1993 | Juriga . |
| 5,280,991 | 1/1994 | Weiland . |
| 5,486,256 | 1/1996 | Romesberg et al. . |
| 5,503,903 | 4/1996 | Bainbridge et al. . |
| 5,582,906 | 12/1996 | Romesberg et al. . |
| 5,591,289 | 1/1997 | Souders et al. . |
| 5,660,908 | 8/1997 | Kelman et al. . |
| 5,683,796 | 11/1997 | Kornylo et al. . |
| 5,688,022 | 11/1997 | Adams et al. . |
| 5,721,038 | 2/1998 | Kornylo et al. . |

Primary Examiner—Elizabeth M. Cole
(74) Attorney, Agent, or Firm—Cowan, Liebowitz & Latm P; Michael I. Wolfson

(57) ABSTRACT

A non-fiberglass containing sound absorbing moldable laminate of a fibrous batt and stiffening mats formed from chopped mono-filament polyester bonded by a thermoplastic binder is provided. The mono-filament mats stiffen the batt and allow use of all thermoplastic material in the composite.

6 Claims, 1 Drawing Sheet

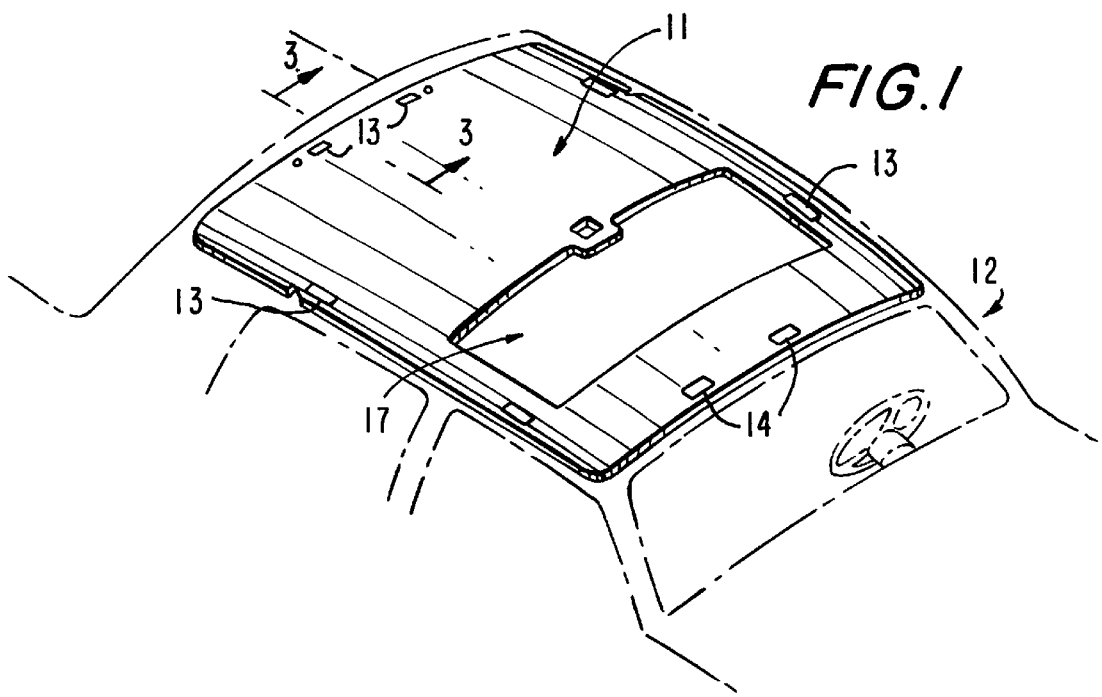
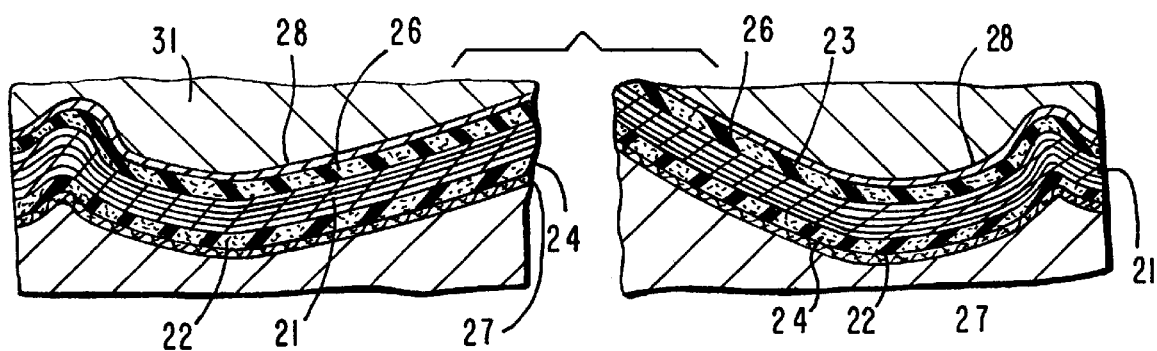
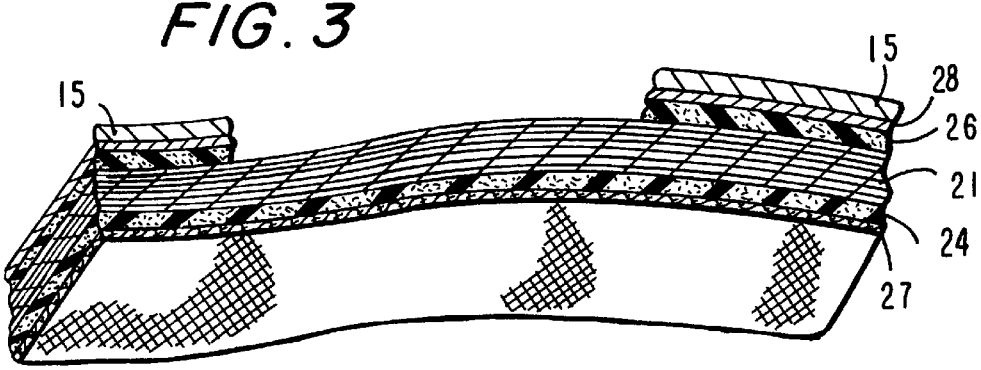

NON-FIBERGLASS SOUND ABSORBING MOLDABLE THERMOPLASTIC STRUCTURE

BACKGROUND OF THE INVENTION

This invention relates to a non-fiberglass sound absorbing moldable thermoplastic structure and a method of manufacture, and more particularly to moldable headliners made from such structures for use in motor vehicles.

Prior art constructions of moldable headliners for trucks and automotive vehicles generally included a phenolic saturated fiberglass mat molded into a shell. In a secondary step, a cloth decorative outer layer, usually of a nylon tricot fabric backed with a 3 mm foam layer is attached to the shell. The foam helps to hide imperfections in the fiberglass shell.

The automotive industry recently has moved away from this construction to accepted European technology. This newer technology involves use of a multi-layered composite including a foam core and two outer layers of chopped fiberglass. The fiberglass is either chopped in place or provided in mat form and generally includes fiberglass yarns in tow form cut to about 1.27 to 10.16 cm (½" to 4") long. This tri-laminate is saturated with an isocyanate resin which bonds the layers together during the molding process which forms the part into a shape to fit into a specific vehicle. The fiberglass layers on either side of the foam core are included to impart proper stiffness to the headliner part.

The European triplex construction is generally further sandwiched between outer film layers. These film layers act as barriers to prevent the liquid isocyanate resin from penetrating through the top layer which is the decorative fabric. Similarly, the film layer on the back of the part prevents the isocyanate from penetrating the backing mold release layer and contaminating the mold. If the liquid adhesive bleeds through the decorative fabric, it would be visible and a cause for rejection of the part, or it could cause sticking or attachment of the back side of the part to the mold.

There are ongoing efforts in the automotive industry to provide a moldable headliner part which does not include any fiberglass in the construction. This move away from the use of fiberglass is driven by health concerns and/or irritation to workers handling conventional headliners containing chopped fiberglass. The industry also desires to produce a headliner part which can more readily be recycled into a single feed stream. The use of natural fibers such as jute, hemp or flax are other alternatives to fiberglass, but they interfere with recycling into a single feed stream when thermoplastic fibers and/or binders are utilized in other layers of the composite.

One example of a commercial sound absorbing laminate is shown in U.S. Pat. No. 4,828,910 to Haussling. Here the laminate structure includes a reinforcing porous mat of chopped glass fiber integrally bonded to a resilient fibrous batt. A decorative cover sheet covers the exposed or exterior surface of the reinforcing mat all bonded together by a thermoset resin binder. The reinforcing mats sandwiching the fibrous batt are of glass fibers bonded together by a thermoformable resin. Finally, a porous cloth scrim as a release layer is adhesively secured to the back of the reinforcing mat by the thermoset resin coating the mat.

Another type of molded automobile headliner is shown in U.S. Pat. No. 4,840,832 to Weinle, et al. Here, the headliner is formed from a batt of polymeric fibers including at least a portion of potentially adhesive fibers. The headliner is characterized by being of a highly deformable resilient construction to facilitate installation in the vehicle. The fibers in the batt are bonded together at a multiplicity of locations which impart a self-supporting molded rigidity allowing the headliner to retain its shape when installed. A flexible foam layer is adhered to one surface of the flexible batt and the outer textile fabric is bonded to the foam layer.

U.S. Pat. No. 5,591,289 to Souders, et al describes another headliner based on a fibrous batt including binder fibers coated with a thermoset resin for imparting stiffness to the part. In U.S. Pat. No. 5,660,908 to Kelman, et al. A 100% polyethylene terephthalate (PET) headliner is formed from a fibrous batt having a plurality of impressions which are filled with PET filler and bonded to a PET scrim for imparting additional stiffness.

While the constructions using fibrous batts produce some improvement, the weight necessary to achieve the required stiffness is prohibitive. Accordingly, it remains desirable to improve these new constructions and provide a moldable headliner which will absorb sound and which is based on an easily fabricated all thermoplastic materials and wholly non-fiberglass containing moldable structure.

SUMMARY OF THE INVENTION

Generally speaking, in accordance with the invention, a non-fiberglass containing sound absorbing moldable structure and a method of fabrication is provided. The non-fiberglass construction is provided by forming the structure from a batt of polyester fibers bonded with a thermoplastic resin, such as a polyester or polyamide as a core. Porous stiffening fibrous mats are disposed on both surfaces of the fibrous batt. These mats are formed from chopped polyester mono-filaments and a polyester binder. The outer surface of the composite includes a decorative outer face fabric thereon and the back surface includes a mold release layer formed of a non-woven polyester web. If liquid resins are used to bond the various layers, a non-porous thermoplastic film may be used to prevent liquid resin from contaminating the mold surface.

The composite based solely on polyester fiber and thermoplastic binders has sufficient stiffness due to use of the mono-filament polyester fibers in the porous stiffening mats. These mono-filaments are generally between 0.0254 to 0.635 mm (0.001" to 0.025") in thickness and are chopped in lengths from 0.635 to 10.16 cm (¼" to 4") long. The mono-filaments may be chopped in place or provided in supporting mats which may be provided in roll or sheet form for fabricating the multi-layer composite. The fibrous batt in combination with the mono-filament stiffening mats provide a totally non-fiberglass construction allowing a single recycle stream with enhancement of the overall acoustical performance of the headliner.

Accordingly, it is the object of the invention to provide an improved non-fiberglass containing sound absorbing multiple structure.

Another object of the invention is to provide an improved non-fiberglass sound absorbing moldable structure including a core of a fibrous batt bonded with adhesive resin.

A further object of the invention is to provide an improved non-fiberglass sound absorbing moldable structure including porous stiffening mats of mono-filament polyester fiber in a resin binder.

Yet a further object of the invention to provide a non-fiberglass porous mat using a film, powder, or liquid resin adhesive.

Yet another object of the invention is to provide an improved method for fabricating non-fiberglass containing sound absorbing composites.

Still other objects and advantages of the invention all or in part be obvious and all in part be apparent from the specification.

The invention accordingly comprises several steps and the relation of one or more of such steps with respect to each of the others, and the products which possess the characteristics, properties and relation of constituents (components), all as exemplified in the detailed disclosure hereinafter said forth, and the scope of the invention will be indicated in the claims.

BRIEF DESCRIPTION OF THE DRAWINGS

For a fuller understanding of the invention, references is had to the following description taken in connection with the accompanying drawings, in which:

FIG. 1 is a perspective view from above a vehicle of a headliner constructed and arranged in accordance with the invention;

FIG. 2 is a partial cross-sectional view of the headliner of FIG. 1 showing how the headliner is molded; and FIG. 3 is an enlarged partial sectional view of the headliner of FIG. 1 showing the component taken along line 3—3 in a vehicle.

DESCRIPTION OF THE PREFERRED EMBODIMENTS

A headliner 11 constructed and arranged in accordance with the invention is shown mounted to the underside of the roof of an automobile vehicle 12 in FIG. 1. Headliner 11 may be fastened in a number of conventional ways at points 13 well known in the art and not described herein. These methods include adhesives, use of velcro attachments, fastener strips and various types of moldings. Headliner 11 may be molded in non-uniform thickness as shown in FIG. 2. Headliner 11 may also include various regions 14 for visors and a cut out region 16 for a dome lamp and a large open region 17 for a sunroof in a vehicle roof 15.

FIG. 3 illustrates in detailed cross-section headliner 11 taken along line 3—3 of FIG. 1. A fibrous core batt 21 of chopped polyester fiber bonded with thermoplastic adhesive resin, such as polyester or polyamide forms the center or core of headliner 11. Batt 21 has a front surface 22 and an opposed rear or back surface 23. A porous stiffening mat 24 is provided on front surface 22 of batt 21 and a similar mat 26 is disposed on back surface 23. Porous mats 24 and 26 are formed from chopped polyester mono-filament bonded with a liquid or powder thermoplastic resin adhesive. Mats 24 and 26 may be preformed and provided in roll or sheet form or may be chopped during the headliner construction and disposed on fibrous batt 21 at the time of molding.

An outer layer of a decorative fabric 27 which is usually backed with a thin foam to mask surface irregularities is adhered to the outer surface of porous mat 24. Finally, a mold release layer 28 is adhered to the outer surface of porous mat 26. Mold release layer 28 is generally a non-woven polyester web and is also porous. The weight of mold release layer 28 is generally between 17 to 68 grams per square meter (0.5 to 2 ounces per square yard). When liquid resins are used in the composite, a non-porous thermoplastic film, such as low density polyethylene, polyester or polypropylene between about 0.127 to 0.762 mm (0.5 to 3 mils) thick, preferably about 0.0381 mm (1.5 mils) in thickness may be used to prevent contamination of the mold and the decorative textile facing.

During fabrication the components are assembled in the order described above and placed within a mold 31 as shown in FIG. 2. Mold 31 is heated and the thermoplastic resin binders bond the layers together. An alternative method involves preheating the composite to adhere the various layers and shaping the final part using a cold mold.

Porous mats 24 and 26 are included in headliner 11 in order to provide stiffening to the final product after molding. Most commercially available headliners include glass as the strengthening component. However, in view of the desirability of removing fiberglass from headliner 11, chopped polyester mono-filament fibers are utilized together with a powdered or liquid resin to produce the stiffening membrane. The mono-filaments may be round, shaped, or flat in cross-section. They generally are between about 0.0254 to 0.635 mm (0.001" to 0.025") in thickness and are chopped in length from 0.635 to 10.16 cm (¼" to 4") in length. Preferably the mono-filaments are in the range of about 0.127 to 0.381 mm (0.005" to 0.0151") in thickness with lengths from 2.54 to 7.62 cm (1" to 3"). The filaments are bonded to themselves or to a porous non-woven polyester web. Porous mats 24 and 26 are relatively thin and generally are not thicker than several thickness of the mono-filaments. Thus, while the thickness of mats 24 and 26 is not critical, it is generally between about 0.0381 to 0.140 cm (0.015 to 0.055") in thickness and weigh between about 16.75 to 167.5 grams per square meter (0.5 to 5.0 ounces per square yard).

Batt 21 is formed from staple polyester fibers and can be formed by carding and air through bonding or needling. These fibers are generally multi-filaments having a denier of about 2 to 20, and preferably between about 5 to 15. The fibers are chopped a length of about 1.27 to 7.62 cm (½" to 3"). Batt 21 is generally about 0.762 to 3.81 cm (0.3" to 1.5") thick and is formed of about 10 to 40 percent binder. Preferably, between about 20 to 30 percent binder is utilized to provide a fibrous mass of about 60 to 650 grams per square meter (1.77 to 19.18 ounces per square yard). After molding, the batt can be compressed to as thin as 0.127 to 0.254 mm (5 to 10 mils) to 3.81 cm (1½") depending on the desired thickness and contour of the desired end product.

The following example describes preparation of a non-fiberglass sound absorbing moldable structure in accordance with the invention. This example is presented for purposes of illustration only, and is not intended to be construed in a limiting sense.

EXAMPLE 1

A fibrous batt is formed by carding or other means and a liquid or powder binder is added. This batt is heated to dry or melt the binder, generally with hot air to retain the high loft.

Polyester mono-filament of approximately 0.254 mm (0.01") thickness is chopped to a length of about 5.08 cm (2"). These mono-filaments are disbursed on a light weight polyester web or belt along with a powdered polyester or polyamide resin and passed between heated rolls to form a stand alone chopped polyester mono-filament mat. The polyester mono-filament mat is placed on both surfaces of the polyester fiber batt, a decorative facing fabric is disposed on the outer surface of the mono-filament mat and a non-porous polyester web is applied to the back surface to act as a mold release layer. The web can accompany the mono-filament mat as described above. Additional liquid binder may be added prior to the outer surface introduction if added peel resistance is required.

The assembled composite is placed within a mold cavity, the mold is closed and heated to approximately 93° to 177°

C. (200°–350° F.) for 1–10 minutes. On removal and cooling of the composite from the mold, the various layers are sufficiently adhered to each other so that the part may be utilized as a sound absorbing headliner in a motor vehicle. An alternative method is to preheat the flat composite and cold mold the part to shape.

By constructing and assembling a headliner in accordance with the invention so as not to include any fiberglass material, a product which may be recycled in a single stream is provided. A headliner providing improved sound absorbing qualities is also obtained.

It will thus be seen that the objects set forth above, among those made apparent from the preceding description, are efficiently attained and since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

Particularly, it is to be understood that in said claims, ingredients or compounds recited in the singular are intended to include compatible mixtures of such ingredients wherever the sense permits.

What is claimed is:

1. An all thermoplastic non-fiberglass containing sound absorbing moldable structure, comprising:
    a fibrous batt consisting essentially of chopped polyester fiber mixed with a thermoplastic resin binder having a weight between about 60 to 650 grams per square meter (2 to 20 ounces per square yard) in the form of a sheet having a front planar surface and a rear planar surface;
    a porous mat of chopped polyester mono-filament dispersed in a thermoplastic binder disposed on both front and rear surfaces of the fibrous batt;
    a decorative fabric disposed on the porous mat on the front surface of the batt; and
    a non-woven polyester web mold release layer disposed on the porous mat on the back surface of the batt.

2. The molded structure of claim 1, wherein the thermoplastic resin binder in the fibrous batt is a polyester resin.

3. The moldable structure of claim 1, wherein the thermoplastic resin binder in the fibrous batt is a polyamide resin.

4. The molded structure of claim 1, wherein the thermoplastic binder in the porous mat is a polyester resin.

5. The moldable structure of claim 1, wherein the polyester mono-filaments are between about 0.0254 to 0.635 mm (0.001 to 0.0251") in thickness and chopped to a length between about 6.35 to 101.6 mm (¼ to 4") in length.

6. The moldable structure of claim 1, wherein the monofilaments in the porous mat are bonded to a non-woven polyester web.

\* \* \* \* \*